(12) United States Patent
Ortega

(10) Patent No.: US 6,507,816 B2
(45) Date of Patent: *Jan. 14, 2003

(54) METHOD AND APPARATUS FOR EVALUATING THE ACCURACY OF A SPEECH RECOGNITION SYSTEM

(75) Inventor: Kerry A. Ortega, Raleigh, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,812
(22) Filed: May 4, 1999
(65) Prior Publication Data
US 2002/0177999 A1 Nov. 28, 2002

(51) Int. Cl.[7] .............................................. G10L 15/26
(52) U.S. Cl. ........................ 704/235; 704/244; 704/243; 704/251; 704/256
(58) Field of Search ................................. 704/235, 254, 704/270, 275, 231, 255, 244, 251, 252, 243, 256, 257, 241, 272, 250; 707/500, 501

(56) References Cited

U.S. PATENT DOCUMENTS

| | | | | |
|---|---|---|---|---|
| 5,712,957 A | * | 1/1998 | Waibel et al. | 704/240 |
| 5,799,213 A | * | 8/1998 | Mitchell et al. | 704/235 |
| 5,829,000 A | * | 10/1998 | Huang et al. | 704/252 |
| 5,855,000 A | * | 12/1998 | Waibel et al. | 704/235 |
| 5,864,805 A | * | 1/1999 | Chen et al. | 704/235 |
| 5,909,667 A | * | 6/1999 | Leontiades et al. | 704/275 |
| 5,960,447 A | * | 9/1999 | Holt et al. | 707/500 |
| 5,970,460 A | * | 10/1999 | Bunce et al. | 704/278 |
| 6,064,959 A | * | 5/2000 | Young et al. | 704/251 |
| 6,138,099 A | * | 10/2000 | Lewis et al. | 704/257 |
| 6,185,530 B1 | * | 2/2001 | Ittycheriah et al. | 704/255 |
| 6,195,637 B1 | * | 2/2001 | Ballard et al. | 704/235 |

* cited by examiner

Primary Examiner—Vijay Chawan
(74) Attorney, Agent, or Firm—Akerman Senterfitt

(57) ABSTRACT

A method and system for evaluating the accuracy of a computer speech recognition system counts and indexes the total number of words dictated and the number of words corrected. The corrections are tallied after being made in a correction window and include words contained in an alternative list as well as words input by the user and within a stored word database. A processor calculates the approximate accuracy of the speech recognition system as the ratio of the number of correct words to the total number of words dictated. An accuracy ratio is calculated for each dictation session and an overall ratio is calculated for all sessions combined. The system also keeps individual and overall indexes of the number of times the corrected words were in alternate lists or not within the word database and uses these indexes to calculate additional accuracy values.

20 Claims, 2 Drawing Sheets

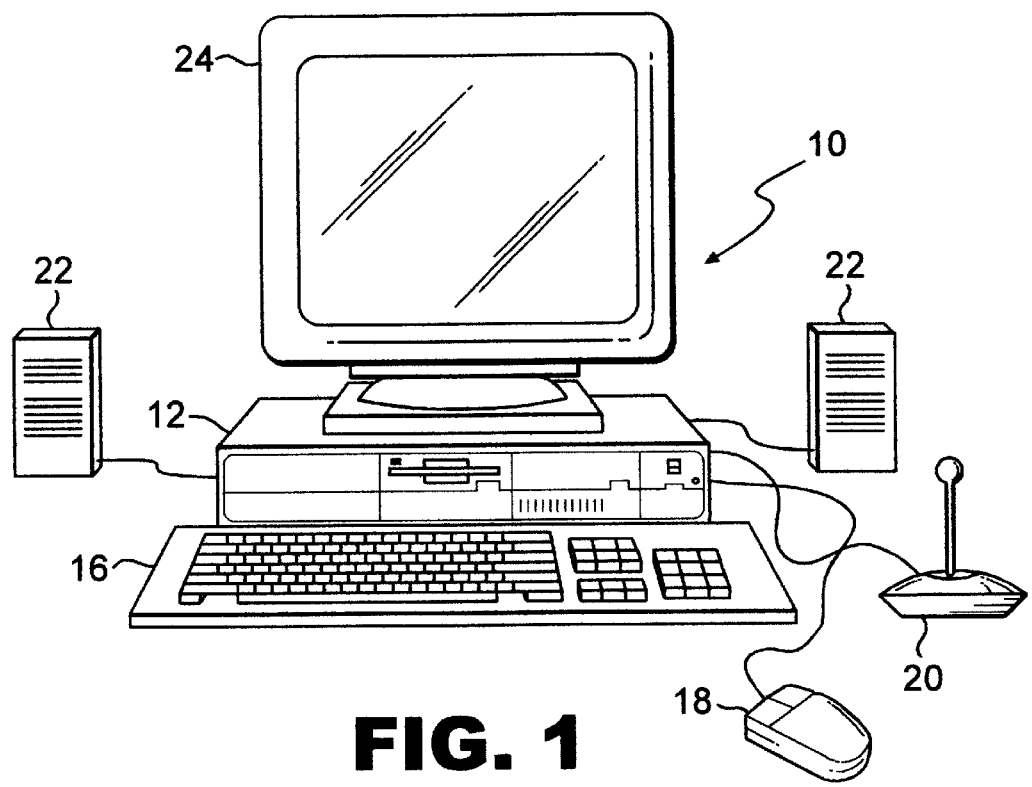
FIG. 1
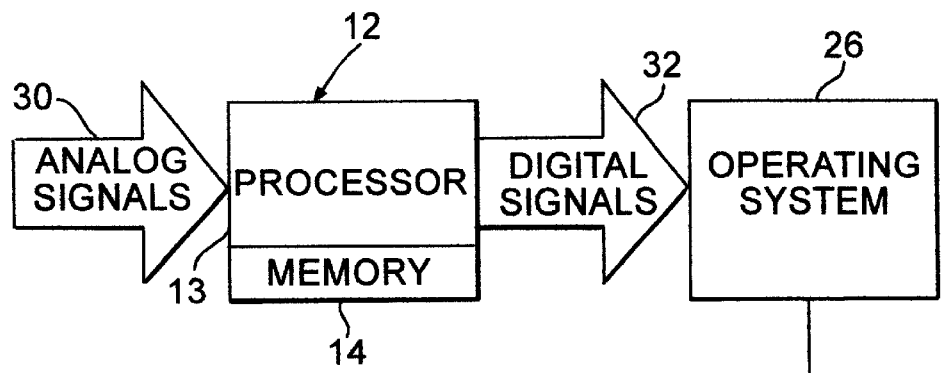
FIG. 2
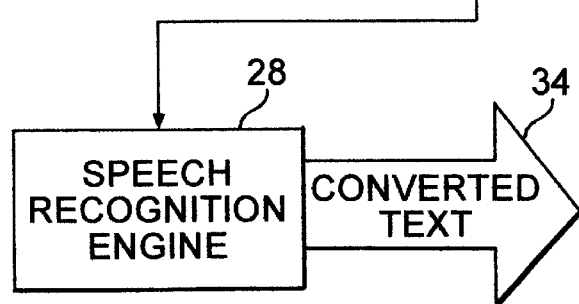

METHOD AND APPARATUS FOR EVALUATING THE ACCURACY OF A SPEECH RECOGNITION SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition computer applications and more specifically to a system for evaluating how accurately dictated words are discerned by a speech recognition system.

2. Description of the Related Art

Speech recognition is the process by which acoustic signals, received via a microphone, are "recognized" and converted into words by a computer. These recognized words may then be used in a variety of computer software applications. For example, speech recognition may be used to input data, prepare documents and control the operation of software applications. Speech recognition systems programmed or trained to the diction and inflection of a single person can successfully recognize the vast majority of words spoken by that person.

When it is to be used by a large number of speakers, however, it is very difficult for the speech recognition system to accurately recognize all of the spoken words because of the wide variety of pronunciations, accents and divergent speech characteristics of each individual speaker. Due to these variations, the speech recognition system may not recognize some of the speech and some words may be converted erroneously. This may result in spoken words being converted into different words ("hold" recognized as "old"), improperly conjoined spoken words ("to the" recognized as "tooth"), and spoken words recognized as homonyms ("boar" instead "bore").

The erroneous words may also result from improper technique of the speaker. For example, the speaker may be speaking too rapidly or softly, slurring words or located an improper distance from the microphone. In this case, the recognition software will likely generate a large number of mis-recognized words.

Conventional speech recognition systems often include a means for the user to retroactively rectify these errors following the dictation. Typically, this is accomplished by providing a correction "window" for interfacing with the user. To simplify the correction process, most such correction windows provide a list of suggested or alternate words that in some way resemble the dictated words. This is accomplished by executing an algorithm as is known in the art, one much like a spell checking program in word processing applications, to search a system database for words with similar characteristics as the incorrectly recognized words. The algorithm outputs a list of one or more alternate words from which the user may select the intended word. If the intended words are not in the alternate list, the user may type in the words. After the intended word is selected or keyed in, the algorithm substitutes the corrected word for the erroneous word.

Although the alternate list simplifies the correction process, it does not aid in preventing the occurrence of mis-recognized text. For this, conventional speech recognition systems typically utilize "help screens" or online tutorials that the user may search to find information on a specific query or topic. Although the help files may provide information regarding possible solutions to the mis-recognition, they typically do not provide feedback specific to the speaker or dictation session.

Principally, this is because typical speech recognition systems do not track the frequency in which words are mis-recognized for each dictation session. Thus, it would be desirable to provide a simple correction-tracking system for evaluating the recognition accuracy of speech recognition systems, which can be employed to provide users with specific solutions to mis-recognition problems.

SUMMARY OF THE INVENTION

The present invention provides a simple method and system for evaluating the accuracy of a speech recognition system. The invention indexes one or more parameters for each dictation session and uses the parameters to calculate one or more accuracy ratios.

Specifically, the present invention provides a method and system for evaluating how accurately dictated words are recognized during a dictation session by a speech recognition system. The present invention counts the number of dictated words so as to create a total word index and counts the number of mis-recognized words to create a correction index. Then, the correction index is subtracted from the total word index to create a recognition index. An accuracy value is calculated as the ratio of the recognition index to the total word index.

The present invention tracks the total number of words dictated as well as the number of corrections for each dictation session. These values are used to estimate the accuracy of the speech recognition system for a specific dictation session. One object and advantage of the present invention is that the calculated accuracy ratio can be used to initiate problem solving applications or procedures based on the performance of each dictation session.

Another object and advantage of the present invention is that it does not require a great deal of computer memory or processing power. The present invention requires minimal mathematical manipulation and data storage. Simple counting and calculation processes are all that is needed to perform the present invention.

In a preferred embodiment of the present invention, the accuracy of the speech recognition system may also be evaluated according to the number of times corrected words are within a word database as well as the number of times the intended words are suggested in a list of one or more alternate terms. Specifically, each mis-recognized word is compared to at least one alternate word. An alternate index counts each time one of the alternate words is the word intended by the speaker. If the intended word is not within the alternate list, the user inputs one or more corrected words. Then, the number of corrected words not contained in the word database are counted to create an out-of-vocabulary index. The total word index is adjusted if the intended term that was suggested as an alternate or input by the user contained more than one word. In this embodiment, the correction index counts only the number of corrected words in either the alternate list or the word database, and the recognition index is this correction index subtracted from the total word index. The accuracy value is again calculated as the ratio of the recognition index to the total word index.

Thus, an additional object and advantage of the present invention is that it provides an accuracy value according to one or more parameters. This affords a more thorough evaluation of the accuracy of the speech recognition system.

The system and method of the present invention can also sum each respective index for each dictation session and calculate one or more overall accuracy ratios. Thus, the invention provides yet another object and advantage in that it can also approximate the accuracy of the speech recognition system independent of specific users or dictation sessions.

BRIEF DESCRIPTION OF THE DRAWINGS

There are shown in the drawings embodiments which are presently preferred, it being understood, however, that the invention is not so limited to the precise arrangements and instrumentalities shown, wherein:

FIG. 1 shows a computer system for speech recognition with which the method and system of the present invention may be used;

FIG. 2 is a block diagram showing a typical architecture for the computer system of FIG. 1 having a speech recognition engine.

DETAILED DESCRIPTION OF THE PREFERRED EMBODIMENT

Figure 3:
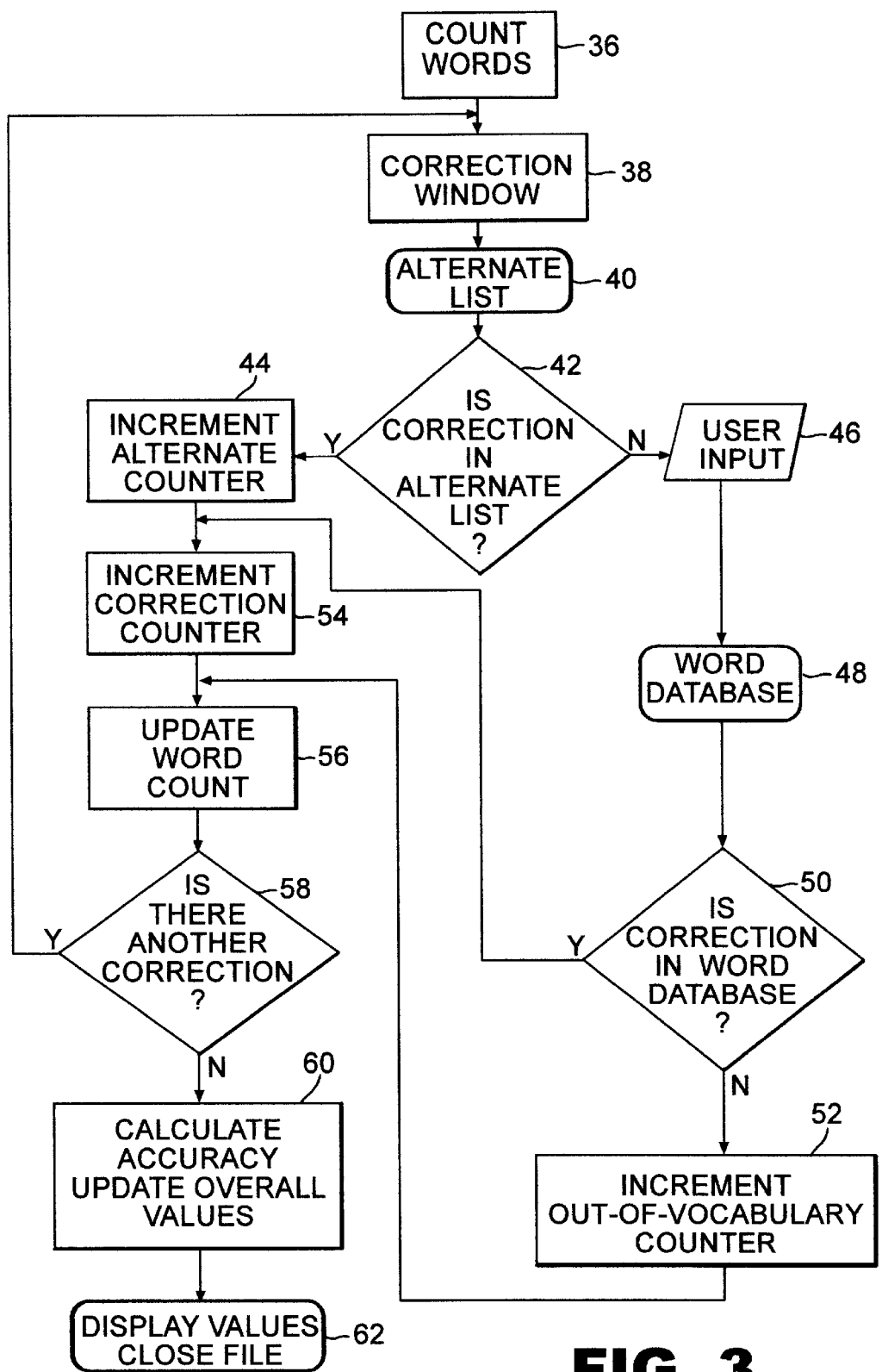
FIG. 3 is a flow chart illustrating a preferred embodiment of the method and system for evaluating the accuracy of a speech recognition system according to the present invention.

Referring to the drawings in detail, wherein like reference characters represent corresponding elements throughout the several views, more specifically referring to FIG. 1, a computer system with which the present invention may be practiced is referred to generally by reference number 10. The computer system 10 is preferably comprised of a computer 12 having a central processing unit 13 (FIG. 2), at least one memory device 14 and related electronic circuitry (not shown). The computer system 10 also includes user input devices, a keyboard 16 and a pointing device 18, a microphone 20, audio loud speakers 22, and a video display 24, all of which are operatively connected to the computer 10 via suitable interface circuitry. The pointing device 18 and loud speakers 22 may be a part of the computer system 10, but are not required for the operation of the invention. The computer system 10 also includes an operating system 26 and a speech recognition engine application 28, as shown in FIG. 2.

Generally, the computer system 10 as described above can be satisfied by any one of many high-speed multimedia personal computers commercially available from manufactures such as International Business Machines Corporation, Compaq, Hewlett Packard, or Apple Computers. The memory devices 14 preferably include an electronic random access memory module and a bulk storage device, such as a magnetic disk drive. The central processing unit may be any suitable processing chip, such as any of the Pentium family microprocessing chips commercially available from Intel Corporation. The operating system 26 is any suitable application-controlling system, preferably one of the Windows family systems commercially available from Microsoft Corporation of Redmond, Wash. The speech recognition engine 28 can include, in one application or separate components, a speech text processor (not shown) and a voice navigator (not shown), but these are not required to practice the present invention.

Referring to FIG. 2, analog audio signals 30 containing sound received by the microphone 20 are processed within the computer 12 using conventional audio circuitry with an analog to digital convertor to produce a digitized form of the signals, represented as reference numeral 32. The digital signals are transferred from the operating system 26 to the speech recognition engine 28 where they are converted into text 34. The converted text is then in operable form for tasks such as inputting data, preparing documents or controlling software applications.

Referring now to FIG. 3, at step 36, the processor 13 receives and counts each string of converted text 34. Preferably, each word is counted as it is received from the speech recognition engine 28, however, the words may be counted after the dictation session is completed. Either way, the processor 13 sums the words and creates an index of the total number of words.

At step 38, preferably after the speaker is finished dictating and all audio has been converted into text, the user or the speech engine 28 executes a correction dialog window or interface to correct mis-recognized text. The correction interface can be executed prior to the completion of the dictation session as well, without departing from the scope of the present invention. The correction interface can take any suitable form, but it is typically a dialog "window", as known in the art, allowing for keyboard 16 or pointing device 18 input from the user. The correction interface may be executed once at the end of the dictation or multiple times during or after the dictation session.

Either way, the correction interface addresses each erroneous text string one at a time. For a first mis-recognized text, at step 40, the correction interface searches a database stored in the memory 14 for alternate word choices with similar spelling or other characteristics to that of the erroneous text. Typically, the correction interface locates one or more possible words for each incorrect word, however, it is possible that no alternates will be found. At step 42, if the correct word as intended by the speaker is within the alternate list, the user may select the word from the list with the pointing device 18 or the keyboard 16. Otherwise, if the intended word is not within the alternate list, the user must key in the word using the keyboard 16 (see step 46).

If the correct word is in fact within the alternate list, the processor 13 proceeds to step 44 wherein it increments a counter indexing the number of times the corrected word was a suggested alternative. Conversely, if the corrected word is not within the alternate list, at step 46, the user keys in the word in a "text box" of the correction window, as is known in the art. Another algorithm is used, at step 48, to search for the typed word in a word database or system dictionary. At step 50, if the word is not included in the database or dictionary, the processor 13 proceeds to step 52 wherein it increments an out-of-vocabulary counter indexing the number of corrected words not contained in the system word database or dictionary. The processor 13 then proceeds to step 56 (described below).

If the corrected word was in the alternate list or the word database, at step 54, the processor 13 increments a counter indexing the number of errors in the converted text. This is the principal parameter used to approximate the accuracy of the dictated words received and processed by the speech recognition application 28. At step 56, the processor 13 checks to see if the correction increases the total number of words, and if so, it updates the total word count 36 accordingly. Then, at step 58, if there are additional corrections, the above routine is repeated, beginning at step 38. Otherwise, at step 60, the correction window is closed, and the counted values are used to calculate representative percentages that are indicative of the accuracy of the speech recognition system (described in detail below). At step 62, the calculated values are displayed on the video monitor 24 for the user at any other suitable time, preferably when the current dictation file is closed.

To determine the approximate accuracy of the system, at step 60, the processor 13 calculates the ratio of correctly recognized words to the total number of words dictated. This value incorporates all corrections that were either suggested as alternates or within the word database or dictionary. Specifically, the processor 13 subtracts the correction index from the total word index to calculate the number of recognized words and create a recognition index. The recognition index is divided by the total word index, which results in a decimal value that may be multiplied by 100% to arrive at the percentage of dictated words that were properly recognized and are within an alternate list or the system word database. This value can then be used by a problem solving application to provide suggestions to the speaker for improving the accuracy of the system. In particular, the calculated ratio or percentage may be compared to an acceptable, minimum accuracy value. If the calculated accuracy falls below this minimum value, then for example, a recognition "wizard" application, as is known in the art, is executed which walks the speaker through proper dictation procedures and suggests techniques to help that specific speaker improve his or her word recognition.

The calculated accuracy of the system improves if any corrections were made using the alternate list. This is appropriate because the correction time is reduced when the correct word is within the alternate list, since a simple click of the pointing device 18 corrects the word without the need to type. Similarly, the calculated accuracy of the system is lowered if any correction was entered by the user that is contained in the system word database. This is appropriate because speech recognition systems typically search a database, similar to the system dictionary, for words which are likely to correspond to the digitized audio signals it receives. If there is no corresponding word in the database, the speech recognition is not likely to recognize the spoken word. This primarily a shortcoming of the word database or dictionary, rather than an inadequacy of the speech recognition engine. However, the speech recognition system should recognize words in the database, and these misrecognitions should be considered in evaluating the accuracy of the speech recognition system.

The counted corrections and accuracy calculations are only an approximation of the actual values. For instance, the system of the present invention does not incorporate errors corrected by re-dictation or typing without executing the correction interface. And, as stated, correction for words that are neither in the alternate list nor the system dictionary are not included in the accuracy calculations.

As described above, the present invention is used to determine accuracy and other parameters for each dictation session. Preferably, a dictation session includes the time when a file is opened, dictation is given and received, corrections are made, and the file is closed. A dictation session, however, can be any suitable time period or set of events.

The present invention may also be used to evaluate the overall accuracy of the speech recognition system. At step 62, the processor 13 adds the session counts to overall totals and stores the values in the memory 14. The session and overall accuracy ratios and count totals are then displayed on the video monitor 24 preferably after the correction window is closed. The overall values provide a more reliable representation of the accuracy of the speech recognition system due to the normalizing effect of averaging. Also, the overall values approximate accuracy independent of dictation sessions or specific users.

While the foregoing description illustrates and describes the preferred embodiments of the invention, it is to be understood that the invention is not limited to the precise construction herein disclosed. The invention can be embodied in other specific forms without departing from the spirit or essential attributes of the invention. Although the preferred embodiment incorporates the alternate and vocabulary index, the present invention could separately calculate accuracy ratios with only one or none of these parameters.

For example, the alternative and out-of-vocabulary indexes could be ignored and the correction index could count all corrections. In this case, a simple ratio of the number of correct words to the total number of words could be calculated. Or, the accuracy of the system taking into account only the alternate index could be calculated. An alternate recognition index could be created by subtracting the correction index from the total word index and adding the alternate index. In this case, the accuracy value would be the ratio of the alternate recognition word index to the total word index. Similarly, the out-of-vocabulary index could be added to the alternate recognition word index to create a vocabulary recognition index, which could be divided by the total word index to create another accuracy value. Conversely, the system accuracy could be calculated based only on whether the intended words were contained in the system word database, without considering the alternate index.

Any of the calculated accuracy ratios or count indexes can be used to launch a problem solving application. Additionally, the counted values for corrections, total words, alternate corrections, and vocabulary may be displayed on the video monitor 24 instead of, or in addition to, the calculated accuracy ratios and percentages. And, overall values of these counts and accuracy ratios can be calculated and displayed as well.

In order to apprise the public of the scope of the invention, the following claims are made.

I claim:

1. In a computer system for speech recognition, a method for evaluating how accurately dictated words are recognized during a single dictation session by a speech recognition system, comprising the steps of:

counting said dictated words to create a total word index;

counting mis-recognized words to create a correction index;

calculating an accuracy value of said speech recognition system for said single dictation session according to said total word and correction indexes.

2. The method according to claim 1, wherein said accuracy value is calculated by subtracting said correction index from said total word index to create a recognition index and computing a ratio of said recognition index to said total word index.

3. The method according to claim 2, wherein said total word and recognition indexes are summed for multiple dictation sessions and said accuracy value is a ratio of said summed recognition index to said summed total word index.

4. The method according to claim 2, further comprising the steps of:

comparing each said mis-recognized word to at least one alternate word;

counting each time said mis-recognized words are corrected by said at least one alternate words so as to create an alternate index; and updating said total word index according to said at least one alternate word.

5. The method according to claim 4, wherein said accuracy value is calculated by adding said alternate index to said recognition index to create an alternate recognition index and computing a ratio of said alternate recognition index to said total word index.

6. The method according to claim 5, wherein said total word and alternate recognition indexes are summed for multiple dictation sessions and said accuracy value is a ratio of said summed alternate recognition index to said summed total word index.

7. The method according to claim 5, further comprising the step of receiving corrected words from user input, wherein said total word index is updated according to said corrected words.

8. The method according to claim 7, further comprising the steps of:

searching a word database for each said user corrected word; and counting each time said user corrected word is not within said word database so as to create an out-of-vocabulary index.

9. The method according to claim 8, wherein said accuracy value is calculated by adding said out-of-vocabulary index to said alternate recognition index to create a vocabulary recognition index and computing a ratio of said vocabulary recognition index to said total word index.

10. The method according to claim 9, wherein said total word and vocabulary indexes are summed for multiple dictation sessions and said accuracy value is a ratio of said summed vocabulary recognition index to said summed total word index.

11. The method of claim 1, further comprising:

executing a problem solving application if said accuracy value is less than a predetermined minimum accuracy value.

12. A system for evaluating the accuracy in which dictated words are recognized during a single dictation session by a computer speech recognition system, comprising:

counting means for determining the number of said dictated words so as to create a total word index and for determining the number of mis-recognized words so as to create a correction index;

calculating means for calculating an accuracy value of said speech recognition system for said single dictation session according to said total word and correction indexes.

13. The system as recited in claim 12, wherein said calculating means calculates said accuracy value by subtracting said correction index from said total word index to create a recognition index and computing a ratio of said recognition index to said total word index.

14. The system as recited in claim 13, further comprising a comparing means and an updating means, wherein:

said comparing means compares each said mis-recognized word to at least one alternate word;

said counting means counts each time said mis-recognized words are corrected by said alternate words so as to create an alternate index; and said updating means updates said total word index according to said alternate words.

15. The system as recited in claim 14, wherein said calculating means calculates said accuracy value by adding said alternate index to said recognition index to create an alternate recognition index and computing a ratio of said alternate recognition index to said total word index.

16. The system as recited in claim 14, further comprising an input means for receiving corrected words from a user, wherein said total word index is updated according to said user corrected words.

17. The system as recited in claim 16, further comprising a searching means, wherein:

said searching means searches a word database for each said user corrected word; and said counting means counts each time said user corrected word is not within said word database so as to create an out-of-vocabulary index.

18. The system as recited in claim 17, wherein said calculation means calculates said accuracy value by adding said out-of-vocabulary index to said alternate recognition index to create a vocabulary recognition index and computing a ratio of said vocabulary recognition index to said total word index.

19. A machine readable storage, having stored thereon a computer program having a plurality of code sections executable by a machine for causing the machine to perform the steps of:

counting dictated words to create a total word index;

counting mis-recognized words to create a correction index;

during a dictation session in a single speech recognition system, calculating an accuracy value of said speech recognition system for said single dictation session according to said total word and correction indexes.

20. The machine-readable storage of claim 19, further comprising:

executing a problem solving application if said accuracy value is less than a predetermined minimum accuracy value.

* * * * *